(No Model.) 4 Sheets—Sheet 1.
J. F. PACKER.
WHEEL.
No. 323,441. Patented Aug. 4, 1885.
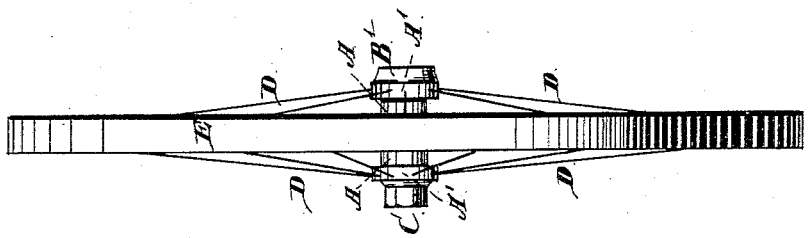
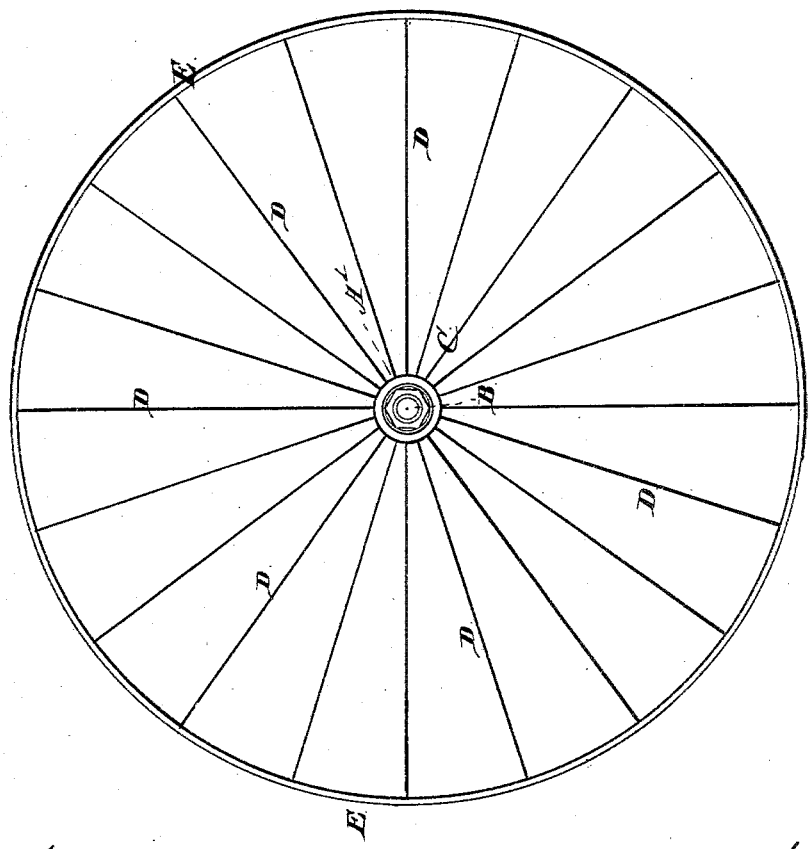
Witnesses:
O. W. Bond.
Albert H. Adams.
Inventor:
John F. Packer (No Model.) 4 Sheets—Sheet 2.
J. F. PACKER.
WHEEL.
No. 323,441. Patented Aug. 4, 1885.
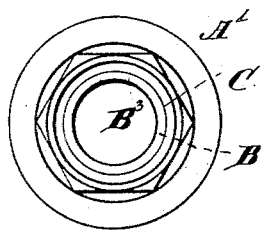
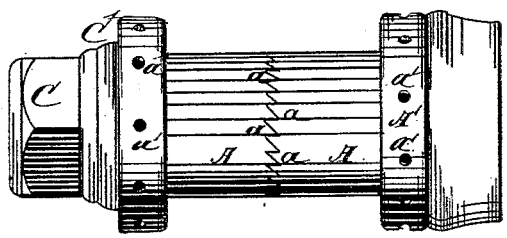
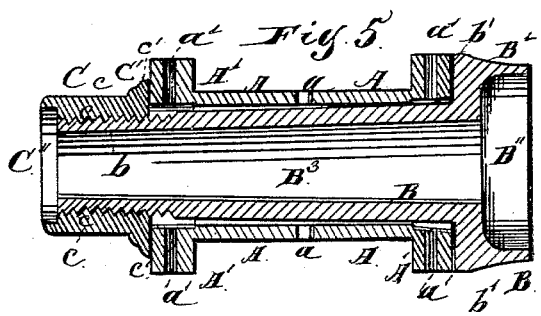
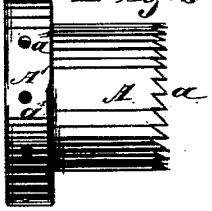
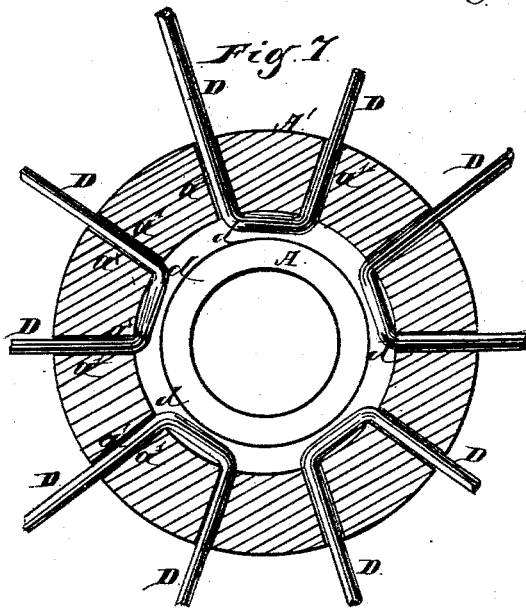
Witnesses.
O. W. Bond
Albert H. Adams
Inventor:
John F. Packer
N. PETERS, Photo-Lithographer, Washington, D. C.

(No Model.)  4 Sheets—Sheet 3.

J. F. PACKER.
WHEEL.

No. 323,441.  Patented Aug. 4, 1885.

Witnesses:
O. W. Bond
Albert H. Adams

Inventor:
John F. Packer (No Model.)  4 Sheets—Sheet 4.
J. F. PACKER.
WHEEL.
No. 323,441.  Patented Aug. 4, 1885.
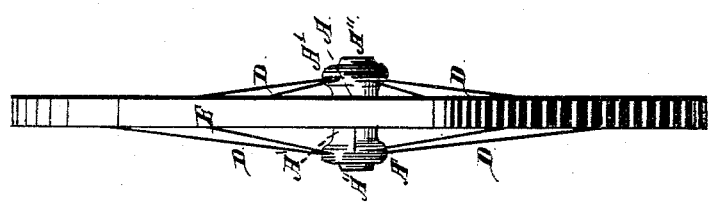
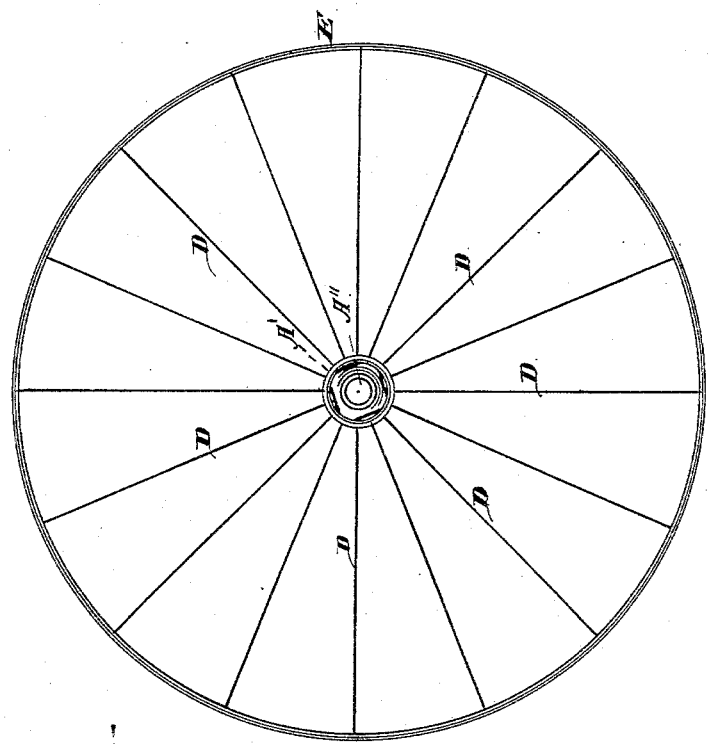
Witnesses:
O. W. Bond
Albert H. Adams
Inventor:
John F. Packer

UNITED STATES PATENT OFFICE.

JOHN F. PACKER, OF CHICAGO, ILLINOIS, ASSIGNOR TO DAVID BRADLEY MANUFACTURING COMPANY, OF SAME PLACE.

WHEEL.

SPECIFICATION forming part of Letters Patent No. 323,441, dated August 4, 1885.

Application filed October 28, 1884. (No model.)

*To all whom it may concern:*

Be it known that I, JOHN F. PACKER, residing at Chicago, in the county of Cook and State of Illinois, and a citizen of the United States, have invented a new and useful Improvement in Hubs and Wheels, of which the following is a full description, reference being had to the accompanying drawings, in which—

Figure 8:
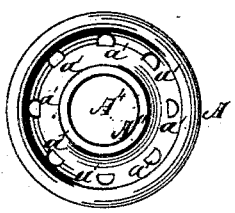
Figure 9:
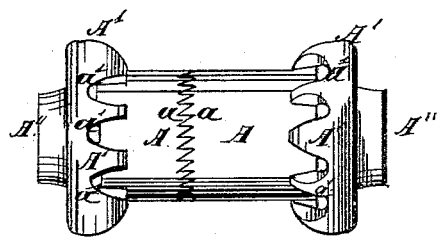
Figure 12:
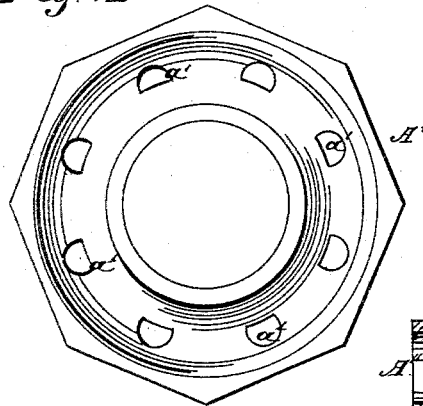
Figure 10:
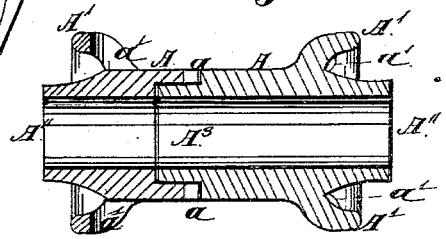
Figure 11:
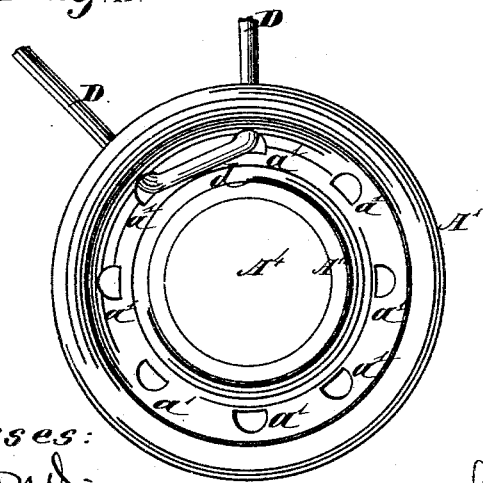

Figure 1 is a side elevation of a complete wheel; Fig. 2, an edge elevation of the wheel; Fig. 3, an end elevation of the hub with a pipe-box; Fig. 4, a side elevation of the parts shown in Fig. 3; Fig. 5, a vertical longitudinal section of the parts shown in Fig. 3; Fig. 6, a side elevation of one section of the hub; Fig. 7, an enlarged detail, being a cross-section through the hub, and showing the manner of inserting the spokes; Figs. 8, 9, and 10, an end view, side elevation, and longitudinal section of a hub without a pipe-box; Fig. 11, an end view, enlarged, showing the manner of inserting the spokes; Fig. 12, an enlarged end view of the hub; Figs. 13 and 14, a side and edge elevation of a complete wheel with a hub having no pipe-box.

This invention is primarily designed for use with what are known as or termed "suspended wheels," or wheels of that class in which the hub is suspended from the rim or tire; but parts thereof can be applied to and used with other styles of wheels.

The objects of the invention are to improve the construction and operation of the hub both in respect to receiving the spoke and to producing the tension required to resist the strain in use, to enable the spokes to be set in such relation to each other as to have a resistance one against another in all directions, and to construct a wheel which will be light and at the same time capable of resisting great strain in use; and its nature consists in the construction and the combination of parts hereinafter particularly described, and then pointed out in the claims.

In the drawings, A represents the hub-sections, each being, as shown, of half the length of the full hub, and each having on its inner end a series of ratchet-teeth, $a$, and on its outer end a flange or rim, A', in which is a series of holes, $a'$, corresponding in number to the number of spokes and at equal distances apart.

B is a pipe-box having at the inner end a flange, B', of larger diameter than the box, and having a square inner face to form a shoulder, $b'$, and the interior of this flange at the end has an opening, B'', to receive the end of the axle, and have the shell of the flange form a sand-box. The exterior of the outer end of the pipe-box is provided with a screw-thread, $b$, and the box has a longitudinal opening, B³, for the passage of the axle, and, as shown in Figs. 3, 4, and 5, the hub-sections A have an interior diameter to fit the exterior of the pipe-box.

C is a lock-nut having at its inner end a flange, C', with a flat face, $c'$, to abut squarely against the end of the hub, as shown in Fig. 5, and, as shown, the outer end of this nut has an opening to receive the nut for the axle, and the nut C has an interior opening provided with a screw-thread, $c$, to receive the screw-thread $b$.

D represents the spokes, made of wire in the form of construction shown, and, as shown, a piece of wire is used of sufficient length to make two spokes, the wire being passed through one opening, $a'$, thence across the space and through the adjoining opening in the flange A', as shown in Fig. 7, so that the portion $d$ between the openings $a'$ will draw against the inner face of the flange A' between the openings, as shown in Fig. 7.

E is the rim or tire, made of steel or other suitable material, and into which the outer ends of the spokes D are inserted and riveted down or otherwise securely fastened.

The construction so far described is designed for use in connection with a pipe-box, and the parts are put together by passing the wire for the spokes through one of the holes $a'$, thence across and through the adjacent hole, and bringing the ends of the two spokes thus formed to the rim, and there riveting or otherwise firmly securing them, the spokes being thus inserted until the entire number for both sections of the hub are secured in place; and when first secured the hub ends of the spokes do not stand exactly in line, and are not strained sufficiently for actual use. The spokes are strained and the proper tension given to the wheel by turning the hub-sections in opposite direction, so as to bring the lower or hub end of the respective spokes on opposite sides in line or to pass each other, which can be done by the use of spanners, wrenches, or other suitable tools; and when the desired tension has been attained the ratchet-teeth engaging will prevent any return movement of the hub-sections, holding them firmly in whatever position they may be set. The pipe-box is next inserted, so that the shoulder $b'$ will abut against the end of the hub-sections, and the screw-nut C is applied to the end of the pipe-box, bringing the shoulder $c'$ in contact with the other end of the hub, holding the hub firmly between the shoulders $b'$ $c'$, so that the ratchet-teeth will be held against accidental displacement, and the hub as a whole will be held from swinging apart. The wheel is now ready for use, and can be applied to the axle in any usual and well-known manner. As shown, the nut C is designed for use in connection with an axle-nut; but it could be used with a linchpin or other fastening device.

Figs. 8 to 12, inclusive, show a construction of hub designed for use without a pipe-box, and Figs. 13 and 14 show a complete wheel, constructed with this form of hub.

The construction of the hub is essentially the same as that already described, consisting of two sections or halves, A, having at their outer end flanges A', with openings $a'$ for the passage of the spokes, and having their inner ends provided with ratchet-teeth. The outer end of each section has a central elongated part, A'', which projects beyond the flanges A' and forms the ends proper of the hub in the form of construction shown; and one section of the hub at the inner end has an elongated portion, A³, which enters a recess formed in the other section, so as to give the hub a central bearing longitudinally around the ratchet-teeth, to prevent displacement when the hub is turned to produce the proper strain on the spoke for the required tension in use. The holes $a'$, instead of passing transversely through the flange A', as in the other form of construction, are formed by cutting a recess on the inner face of the flange A'; but the spokes D are passed through the opening in the manner before described, so as to have a portion, $d$, on the interior of the flange extending from hole to hole, through which the spoke is passed, as shown in Fig. 11.

The strain is put upon the wheel in the same manner as before described by turning the hub-sections against each other, and, if desired to facilitate the turning, the flange $b'$, in either form of construction, may be formed six or eight sided or otherwise, to receive a wrench having a corresponding shape.

The tendency of the strain on the spokes of the hub-sections is to draw them inward, insuring a firm interlocking of the ratchet ends, and this strain is sufficient to hold the hub-sections together under ordinary circumstances, and any spreading will be prevented when the hub is in place by the contact of the ends with the axle-shoulder and the locking-nut or linchpin.

The preferred form is that in which the sections are made of equal length to bring the engaging teeth in line with the center of the rim or tire, so that the strain of the spokes will be at the same distance from the center of the hub in all directions, whereby extra draw at any one point is prevented. This same construction can be used with the form of hub shown in Fig. 10, and is preferred.

I do not claim, broadly, a hub made in two rotatable parts, nor a two-part hub provided with ratchet-teeth on the meeting parts of the hub.

What I claim as new, and desire to secure by Letters Patent, is—

1. A hub consisting of sections of equal length, each having its inner end provided with ratchet or engaging teeth, and its outer end with spoke-openings for bringing the strain equally over the length of the hub and preventing extra draw at any one point, substantially as and for the purposes specified.

2. A hub formed of sections A of equal length, having ratchet-teeth $a$ and end flanges, A', provided with openings $a'$, in combination with spokes D and rim E, whereby the strain is brought equally over the length of the hub and extra draw at any one point prevented, substantially as and for the purpose specified.

3. The combination, with a hub formed of sections A of equal length, having ratchet or engaging teeth $a$, whereby the strain is brought equally over the length of the hub and extra draw at any one point is prevented, of a pipe-box, B, having a flange, B', and a locking-nut, C, substantially as and for the purposes specified.

JOHN F. PACKER.

Witnesses:
ALBERT H. ADAMS,
O. W. BOND.